June 1, 1954

S. W. ALDERSON 2,679,649

PUSH BUTTON MEANS FOR OPERATING POWER-DRIVEN ARTIFICIAL HANDS

Filed Nov. 24, 1952

INVENTOR
SAMUEL W. ALDERSON
BY
ATTORNEY

June 1, 1954

S. W. ALDERSON

2,679,649

PUSH BUTTON MEANS FOR OPERATING
POWER-DRIVEN ARTIFICIAL HANDS

Filed Nov. 24, 1952

INVENTOR
SAMUEL W. ALDERSON
BY
ATTORNEY

June 1, 1954

S. W. ALDERSON 2,679,649

PUSH BUTTON MEANS FOR OPERATING
POWER-DRIVEN ARTIFICIAL HANDS

Filed Nov. 24, 1952

INVENTOR
SAMUEL W. ALDERSON
BY
ATTORNEY

June 1, 1954

S. W. ALDERSON
PUSH BUTTON MEANS FOR OPERATING
POWER-DRIVEN ARTIFICIAL HANDS 2,679,649

Filed Nov. 24, 1952

INVENTOR
SAMUEL W. ALDERSON
BY
*John A. Hall*
ATTORNEY

June 1, 1954

S. W. ALDERSON

2,679,649

PUSH BUTTON MEANS FOR OPERATING
POWER-DRIVEN ARTIFICIAL HANDS

Filed Nov. 24, 1952

INVENTOR
SAMUEL W. ALDERSON
BY

ATTORNEY

Patented June 1, 1954

2,679,649

UNITED STATES PATENT OFFICE 2,679,649

PUSH BUTTON MEANS FOR OPERATING POWER-DRIVEN ARTIFICIAL HANDS

Samuel Weir Alderson, Westport, Conn.

Application November 24, 1952, Serial No. 322,317

6 Claims. (Cl. 3—1.1)

This invention relates to prosthetic devices and particularly to power driven artificial limbs.

The object of the invention is to provide means whereby an amputee may produce comparatively powerful movements of an artificial limb with comparatively little effort and by the use of a short arm stump.

The invention consists of a bank of push buttons mounted in cooperative relationship with an arm stump and which may be selectively operated with little effort by the amputee. In a preferred embodiment of the invention, the amputee is provided with an artificial arm, including a hand, a wrist, a forearm section and an upper arm section, articulated and depending from a shoulder cap strapped to the amputee and presenting a practically natural appearance when the amputee is conventionally clothed. A push button device is mounted on the shoulder cap and has a bank of push buttons facing inwardly which the amputee may selectively operate by his arm stump without movement noticeable to a spectator. The selective operation of these push buttons is translated into various movements of the hand, wrist and arm in a uniquely natural manner. Each push button when operated squeezes a bellows to increase the pressure in a pneumatic system. The bellows is connected through a pneumatic channel to a bladder which through expansion moves a clutch engaging arm to operate either lightly or strongly a multidisc clutch. The movement of the push button also closes an electrical circuit between a source of power such as a small and compact storage battery and an electrical motor. Therefore, when the amputee operates a specific one of the push buttons the motor is started into operation either in one direction or the other and in accordance with the pressure exercised by the amputee on the said push button the multidisc clutch is operated either lightly or strongly to couple the movement of the motor to a specific joint actuator.

A feature of the invention is an arrangement whereby a plurality of said push buttons will operate a common bellows so that a specific clutch may be operated by several push buttons. Thus, if the amputee wishes to produce a movement of pronation he pushes a specific button. If, on the other hand, he wishes to produce a movement of supination, he pushes another specific button. Both of these buttons, however, are coupled to the same pneumatic system and both operate the same clutch to couple the motor to the same joint (wrist) actuator. However, the operation of the two buttons is differentiated by the operation of a different electrical switch so that the operation of the first button will cause the motor to rotate forwardly while the operation of the second button will cause the motor to rotate in the reverse direction.

In the specific embodiment of the invention herein disclosed there are three joint actuators, requiring a transmission device having three multidisc clutches, operated by three separate pneumatic systems and a bank of six push buttons. One joint actuator is employed for finger movement to close or open the grasp between the fingers and the thumb. Another joint actuator is employed for flexion of the wrist and the reverse movement thereof and the third joint actuator is employed for the pronation and the supination of the wrist. Thus there are six push buttons to exercise these six separate movements. There are three pneumatic systems to operate the three clutches to couple the three joint actuators to the common motor.

Another feature of the invention is the provision of a pair of bails to selectively operate two electrical switches, one to cause the motor to operate in a forward direction and the other to cause the motor to operate in a reverse direction.

A feature of the invention may then be stated as the provision of a plurality of push buttons arranged so that a smaller plurality thereof will control a common pneumatic system and a different smaller plurality thereof will control a common electrical switch, each push button having a different specific result, through the combination and permutations of the pneumatic and electrical means.

Another feature of the invention is the provision of an array of bleeder valves mounted to be accessible to the amputee whereby each of the various pneumatic systems may be temporarily opened to adjust the corresponding system to the prevailing atmospheric pressure. Due to atmospheric pressure changes or to temperature changes either from changes in the ambient temperature or from body heat the very finely adjusted transmission device might become subject to erratic operation, so that the provision of this means gives the amputee instant adjustment of the control of the operation of his various joint actuators.

In the specific embodiment of the invention herein disclosed, the push button device and its combinational pneumatic system and electrical switching system is mounted on the shoulder cap.

The motor and the transmission device are mounted within the structure of the forearm and the latter is connected to the joint actuators by flexible shafts extending into and through the wrist section. The battery may be carried in any convenient pocket and the wiring may include a cord plug and connector arrangement for convenient changing of batteries. Under normal use of the artificial arm a battery will last for a full day but may be changed quickly if heavy drain has been put on it.

Another feature of the invention is the provision of a safety device for the operation of the electrical switches. The devices employed are commercially available small sized switches known as micro-switches which require a very small movement for their operation. Each bail rests on the button of such a switch and holds it depressed enough to cause it to be normally operated. When any one of the push buttons is operated the bail is lifted and hence the micro-switch is released. In order to prevent injury to the micro-switch the bail lifter is mounted as a separate pivoted arm on the arm of the push button. This arm will lower the bail to its switch operating position and then move out of contact with the bail so that no extra pressure is put on the button of the micro-switch. Moreover, this lifter arm being pivoted on the push button arm may be closely adjusted to conform to the push button movement, particularly in relation to the point where the movement thereof has sufficiently operated the bellows to actuate the corresponding pneumatic system. Thus the device may be adjusted to cause the motor to start its operation just before the clutch is thrown in.

Another feature of the invention is an adjusting means between the push button arm and the bellows presser whereby the spatial position of the push button may be adjusted to suit the amputee. Thus the push button arm is pivoted midway of its length but contacts the bellows presser at its end while the bellows presser squeezes the bellows at a point between the pivot or fulcrum and the pressure point. This provides a compound lever movement leading to precise control even under inherently clumsy movement by the amputee.

Another feature of the invention is the arrangement of the elements of the device in such manner that adjustments to suit the comfort and capabilities of an individual amputee may be quickly made. If it is found that an individual amputee may select and push on one row of buttons with greater facility than another, then the wiring to the two micro-switches may be interchanged so that the motor is operated forwardly from such buttons rather than from the other row of buttons. Likewise the pneumatic tubes may be interchanged so that the joint actuator most frequently used may be operated by the pair of buttons most comfortably placed for the wearer of this device.

Other features will appear hereinafter.

The drawings consist of six sheets, having fifteen figures, as follows:

Figs. 2, 3 and 4 are perspective views of the device as it is mounted on a shoulder cap strapped to the shoulder of an above the elbow amputee; and in which Fig. 2 is a view from in back of the amputee;

Figure 1:
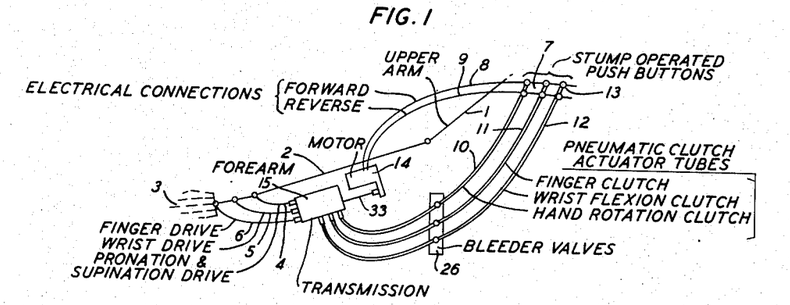
Fig. 1 is a schematic diagram of the cooperative arrangement of the elements of the invention.

The present invention resides in the cooperative combination of a plurality of devices as expressed in the schematic drawing, Fig. 1. Here an artificial arm is indicated by the line 1, for the upper arm section, the line 2, for the forearm section and the group of broken lines 3, for the hand. To work the hand, three joint actuators are provided, each propelled by a flexible shaft, as shaft 4 for the pronation and supination drive, that is the rotation of the hand about the axis of the forearm, the shaft 5 for the wrist flexion drive and the shaft 6 for the finger drive. Certain forms of these drives are disclosed in my Patent Number 2,580,987 granted January 1, 1952, and a finger drive operated by a flexible shaft is disclosed in my application Serial Number 273,866, filed February 28, 1952, now abandoned. A device here generally designated 7 is a push button selector shown in the interest of clarity merely as the intersection of the forward and reverse electrical lines 8 and 9 respectively and the three pneumatic lines 10, for the hand rotation clutch, 11 for the finger clutch and 12 for the wrist flexion clutch. It will appear hereinafter that there is a push button for each "intersection." A push button 13 for the intersection of the forward electrical line 8 and the wrist flexion clutch pneumatic line 12, by way of example, is provided to cause the motor 14 to rotate forwardly and the wrist flexion clutch to be operated so that the hand may be moved downwardly. A transmission unit 15, similar in operation to a transmission device disclosed in my application Serial Number 273,865, filed February 28, 1952, now abandoned, is operated under control of the motor 14 and the three pneumatic lines 10, 11 and 12, and is provided to translate impulses of the various push buttons into the forward or reverse rotation of the three flexible shafts 4, 5 and 6. Thus any one of six different movements may be produced by the operation of any one of the six different push buttons.

It is to be clearly understood that the preferred form of the invention herein disclosed is by way of example only, the prosthetic device, pictured, being one fitted to an amputee having a very short upper arm stump but capable of nice control so that the various push buttons may be easily selected and operated in such a manner that the movements under the amputee's clothing are not noticeable. The invention, however, is not limited to this exact arrangement as the array of push buttons may be placed at any other point and selectively operated in any other manner by the amputee. Nor is the device to be limited to the operation of only three joint actuators, for the principles of the devices may be extended to provide a larger number of push buttons and a larger number of joint actuators. By way of example, an elbow actuator may be operated in the same manner by operating a given clutch to couple the motor to a flexible shaft leading to such elbow actuator. Other joint actuators may be operated in similar manner so that it will be understood that the invention is not limited to the three specific joint actuators herein described.

Figure 2:
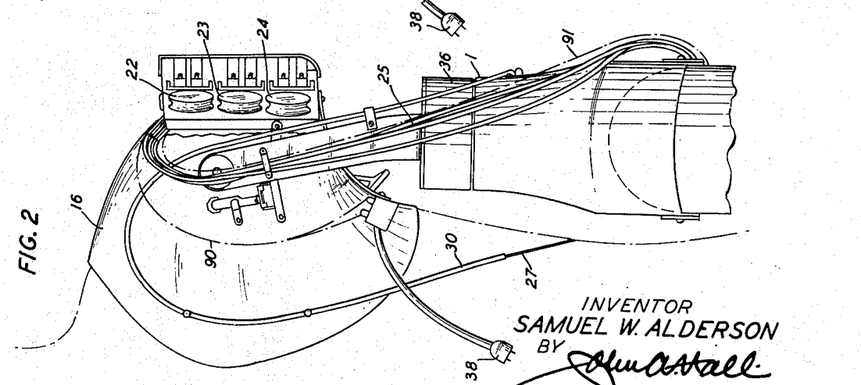
Figures 3, 4:
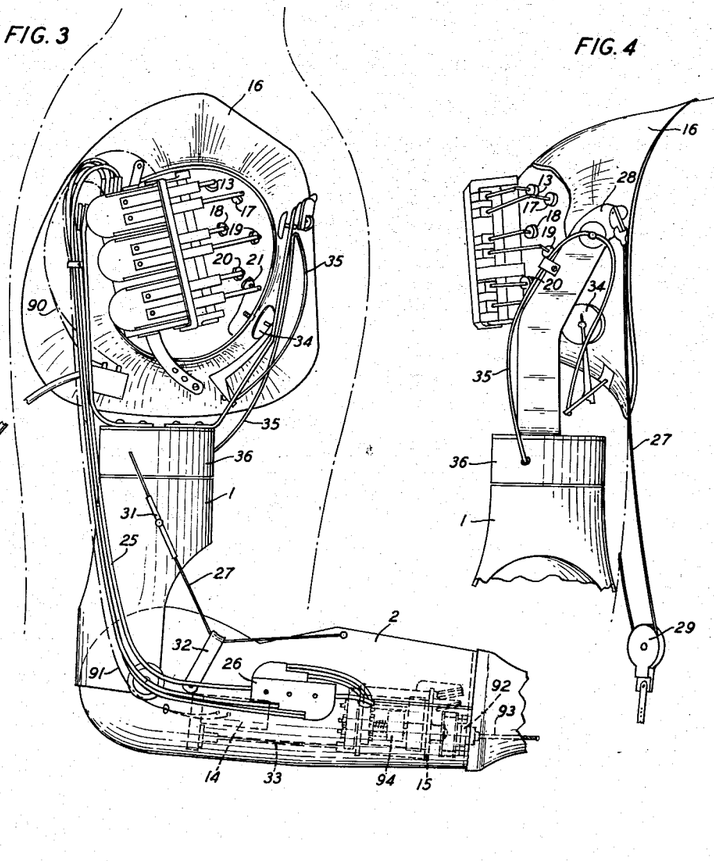
Fig. 3 is a view from the side of the amputee.
Fig. 4 is a view from in front of the amputee.
Figure 5:
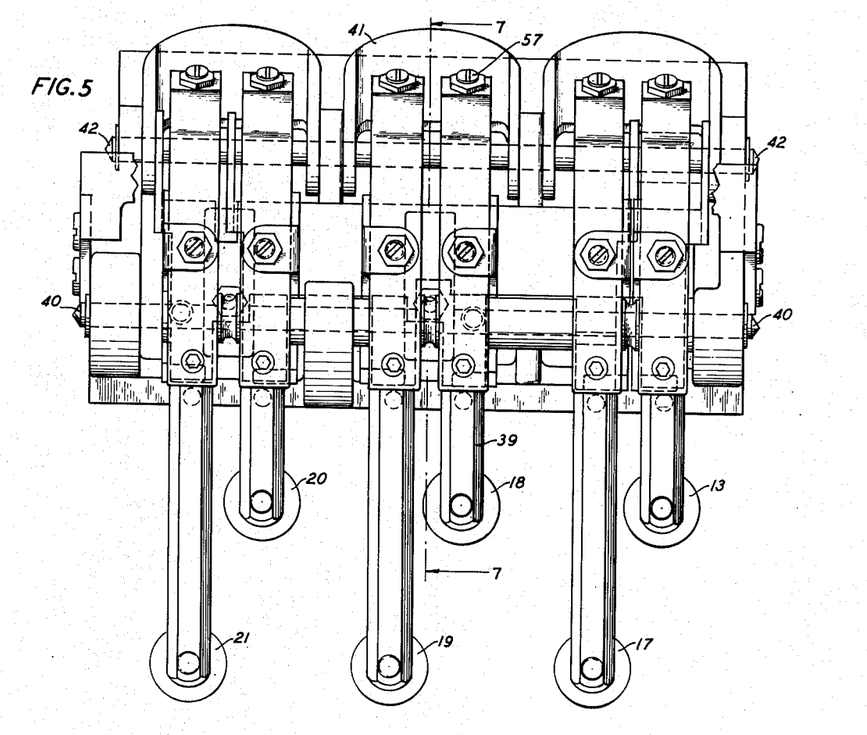
Fig. 5 is a top view of the push button device (much enlarged) which is mounted on the shoulder cap.
Figure 6:
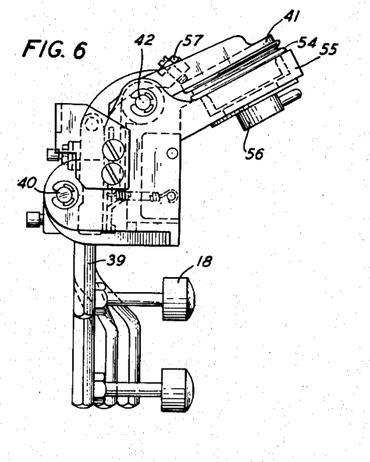
Fig. 6 is a side view of the same device.
Figure 7:
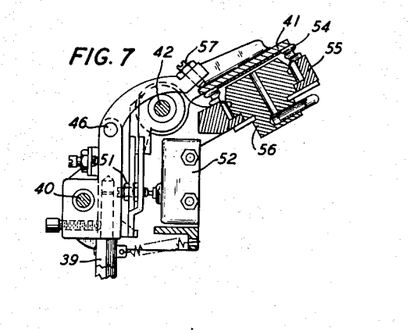
Fig. 7 is a fragmentary side view, partly in section, showing the location and organization of the electric switching means and the bellows for the pneumatic system.

Looking at Figs. 2, 3 and 4 it will be noted that a shoulder cap 16 of plastic material moulded to fit the individual amputee is provided which may be strapped in conventional manner to the amputee's body. The invention has been practiced by securing this device to an amputee who has a very short upper arm stump with which he is capable of sufficient movement and precise control to selectively operate the push buttons 13, 17, 18, 19, 20 and 21 shown in Figs. 3 and 4 respectively. It will be noted that the two push buttons 13 and 17 each operate a bellows 22, that the push buttons 18 and 19 operate a bellows 23 and that the push buttons 20 and 21 operate a bellows 24. It will later be shown in connection with the description of Fig. 13 that the push buttons 13, 18 and 20, by way of example, will operate one micro-switch 52, whereas the push buttons 17, 19 and 21 will operate another micro-switch 53. These two micro-switches will operate to cause the motor to operate forwardly and backwardly respectively. The bellows 22 will be connected pneumatically with a line 25 leading to a means for operating a particular clutch in the transmission device. As shown in the schematic drawing Fig. 1 and in Fig. 3, each of the pneumatic lines leads to and through a bleeder valve device 26. This device constitutes a means whereby the amputee by the simple operation of pushing a button may open the pneumatic line so as to equalize the pressure in that particular pneumatic system to the prevailing atmospheric pressure. This of course is done when the push button device mounted on the shoulder cap is in normal position and the bellows, such as the bellows 22, is not under pressure thereat. This constitutes a means for compensating for rise of temperature from any cause, such as from body heat. It will thus be seen that each push button operates a different combination of pneumatic and electrical lines.

By way of explanation and for purposes of making the disclosure somewhat clearer, the amputee is provided with a device disclosed in my application Serial Number 283,459, filed April 21, 1952, and consisting of a cable 27 attached by one of its ends to the yoke 28 of the upper arm section threaded through a pulley 29 which is attached to a groin strap and thence passing through a sheath 30, a sheath 31 and a guiding strap 32 and thereafter being attached firmly to the forearm section 2 so that the amputee, by shrugging his shoulder, may lift his arm. There is also shown a control 34 which may be operated by the flexion of one of the pectoral muscles to move a cable passing through the sheath 35 and shown herein as entering the part 36 of the upper arm section 1 to operate a turntable lock therein, in accordance with the device disclosed in my application Serial Number 283,460, filed April 21, 1952. It is to be understood that these other controls may also be operated in a manner similar to the operation of the joint actuators controlled by the push buttons 13, etc.

An electrical plug 38 is shown in Figs. 2 and 3 and by a broken line 90 it is indicated that the connection is extended into the push button device so that current derived from a battery 85 to which the plug 38 is attached may be transmitted to the motor over the conductors indicated by the broken line 91 in the forearm section 2.

Looking at the push button selector in somewhat more detail in Figs. 5, 6, 7 and 13 it will be noted that each button, such as the button 18 for instance, is mounted on an operating rod, such as the rod 39, which is pivoted on a shaft 40 and controls an arm which moves a bellows depressor 41. The bellows depressor is mounted on a shaft 42 (shown partly in two places in the exploded view Fig. 13) as well as in Figs. 5, 6 and 7.

Figures 13, 14:
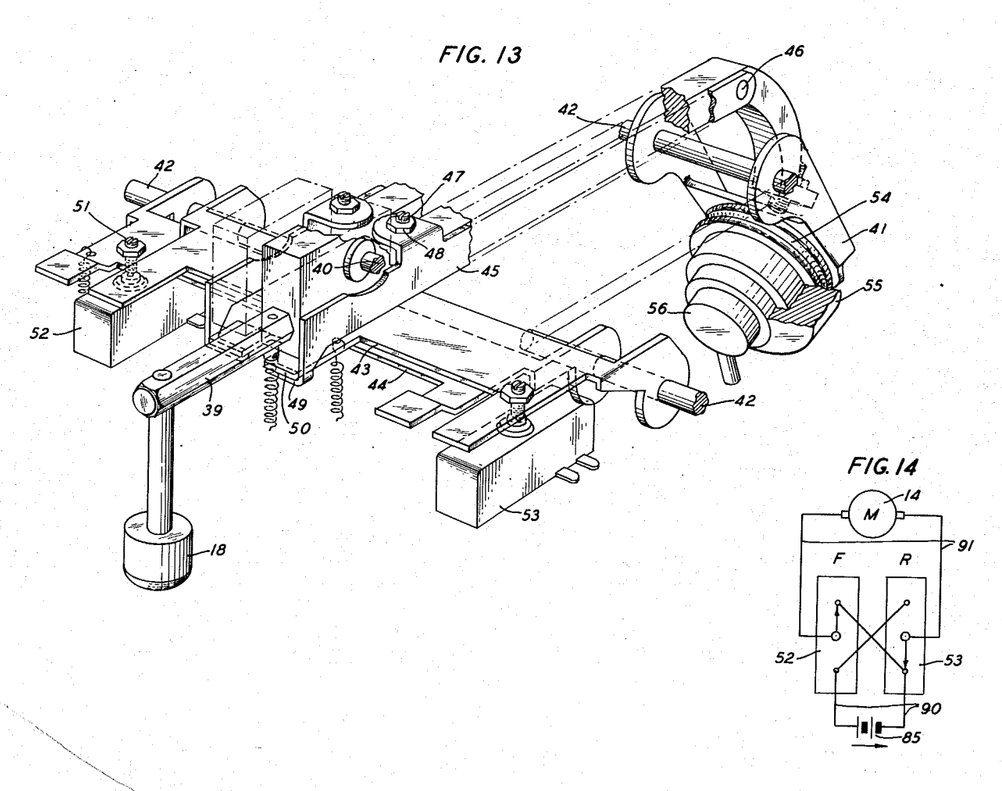
Fig. 13 is a perspective view partially exploded and partly in section showing the cooperative relationship of the essential elements of the push button device of Figs. 5, 6 and 7.
Fig. 14 is a wiring diagram of the device of the present invention, showing the battery, the motor and the two micro-switches.

There are two bails which are also mounted to rotate about the shaft 42, one bail 43 is provided to be operated by the push buttons 13, 18 and 20 as clearly shown in Fig. 13, whereas the other bail 44 is mounted in cooperative relationship with the push buttons 17, 19 and 21. A lifter device 45 is mounted on the operating arm 39 at the pivotal point 46. However, this pivot is very tightly secured so that the coefficient of friction is high and a relative movement of the lifter 45 and the arm 39 can only be made with some difficulty. A screw 47 is provided to force a slight movement between the lifter 45 and the arm 39 for purposes of adjustment and a lock nut 48 is provided to retain the adjustment made thereby. At the forward end of the lifter 45 a tab 49 is bent under the finger 50 of the bail 43 so that as the push button 18 is moved in a clockwise direction the tab 49 will lift the bail 43, since the lifter tab 49 is virtually firmly secured to the arm 39. At one end of this bail 43 an adjusting screw and lock nut combination 51 is provided to operate a micro-switch 52, the arrangement being such that in normal position the micro-switch 52 is operated, but when the push button 18 or one of the other push buttons 13 and 20 is operated then the bail 43 will be rotated in a clockwise direction and will lift the adjusting screw 51 away from the micro-switch 52 and thereby allow it to be operated. A similar micro-switch 53 is controlled by the other bail 44 as clearly shown in Fig. 13.

For the six push buttons there are provided three bellows depressors, such as the depressor 41. Each depressor here operates a bellows 54 shown in section in Fig. 7. The curved portion of this bellows 54 mounted on the bellows shelf 55 will, on depression, increase the pressure in the pneumatic system associated therewith. In this case there is a communication channel through the bellows plug 56 through which a connection may be made to a pneumatic line, such as one of the lines 10, 11 and 12. Each arm operating a bellows depressor ends in an adjusting screw and nut combination, such as that designated 57 in Figs. 6 and 7, so that a nice adjustment of the push button 18 for the comfort of the amputee may be made.

The transmission device, as hereinbefore stated, is similar in many of its details to that disclosed in my application Serial Number 273,865, filed February 28, 1952. The main difference is that here the various clutch actuators are operated by arms moved by the expansion of bladders rather than by mechanical linkages as in the prior device, and that here the array of micro-switches there used has been eliminated. There is provided a gear train consisting of a driving gear 60 operated by a shaft 61 operated by the motor 14, through the flexible shaft 33. This gear meshes with a gear 62 mounted on the wrist clutch shaft and this in turn meshes with an idler gear 63 leading in turn to a gear 64 mounted on the finger clutch shaft and finally transmitting motion and power to the gear 65 mounted on the pronation clutch shaft. Thus, when the motor 14 is started in operation this gear train will cause all three clutches to rotate their driving elements. However, under normal conditions each of the clutches will run idle and will not cause any operation of their driven elements.

When pressure is put on one of the pneumatic lines, such as the line 66 (see Figs. 8, 9, 11 and 12), a bladder 67 will be inflated and this will cause a movement of the arm 68 pivoted on the shaft 69 so that a slight movement of the block 70 will result whereby the set screw 71, used for adjustment, will press against the shaft 72 splined to the gear 65 and will move the disc clutch face 73 inwardly to cause engagement of the discs of the multiple disc clutch 74. Thereby the shaft 75 will be caused to rotate so that a universal joint will rotate to cause the rotation of a flexible shaft. The two pins 76 and 77 are provided for insertion in two corresponding holes of a disc 86 attached to the end of a flexible shaft 87 so that free movement of the shaft may be accomplished.

Figure 8:
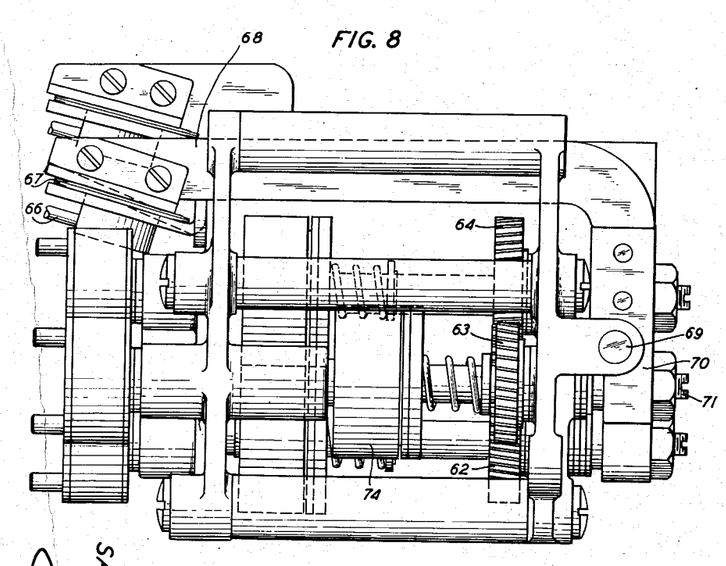
Fig. 8 is a top view of the transmission device used to translate the electrical and pneumatic impulses into forward or reverse rotation of the various joint actuators.
Figure 9:
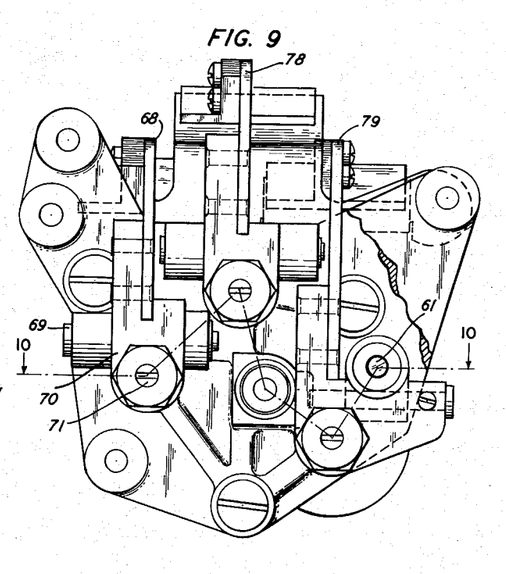
Fig. 9 is an end view of the transmission device.

In like manner the arms 78 and 79 may be rotated or moved by corresponding pneumatic bladders and will cause the movement of the clutch depressors 80 and 81 respectively so that the finger shaft 82 or the twist flexion shaft 83 may be operated.

It is believed to be clear that when a push button is operated by the amputee that pressure will be increased in one of the pneumatic systems whereby a given clutch is operated while at the same time the motor is either started to operate forwardly or backwardly and that the movement of the motor will be transmitted through the operated clutch to operate a given one of the three joint actuators.

The electrical switching system is shown in Fig. 14 in its normal condition. The micro-switch 52 is normally operated to the position shown to its upper terminal by the upper bail 43 and the micro-switch 53 is normally operated to the position shown to its lower terminal by the lower bail 44. Now if the upper bail is lifted the micro-switch 52 is reversed and current from the battery 85 will flow through the motor 14 in one direction whereas if the lower bail 44 is lifted the micro-switch 53 will be reversed and current from the battery 85 will flow through the motor 14 in the other direction. If the micro-switches are positioned as shown no current will flow through the motor, or if both bails are simultaneously lifted then again the motor circuit remains opened. Thus, if a forward and a reverse button are simultaneously pushed there will be no resulting operation. However, if two forward buttons are pressed simultaneously the two corresponding joint actuators will be operated simultaneously so that compound movements may be executed.

Figure 10:
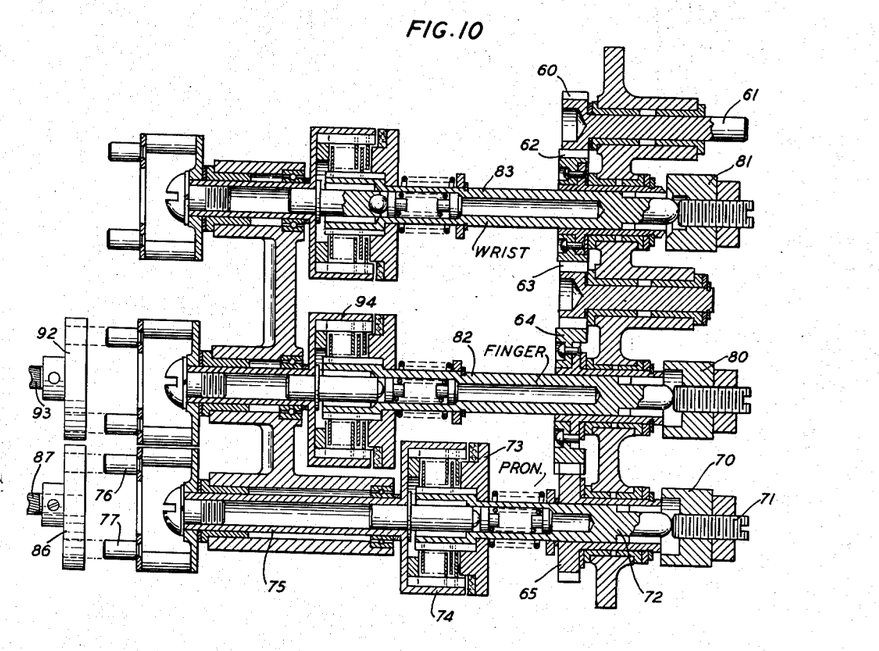
Fig. 10 (on the same sheet with Fig. 1) is a cross sectional view of the transmission gearing and clutch devices, taken on the line 10, 10 of Fig. 9.
Figure 11:
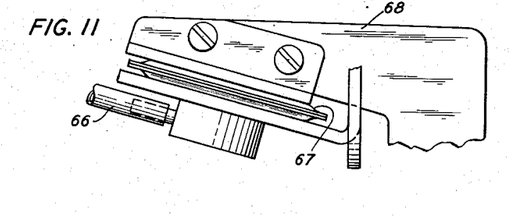
Fig. 11 is an enlarged view of the bladder shelf and the bladder indicating more clearly the means by which the pneumatic line is attached to the transmission device.
Figure 12:
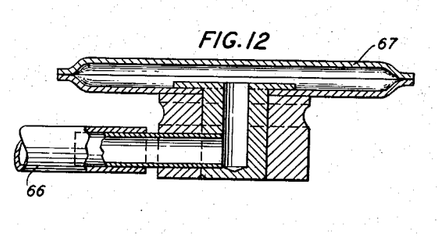
Fig. 12 is a cross sectional view of the pneumatic connections of Fig. 11.
Figure 15:
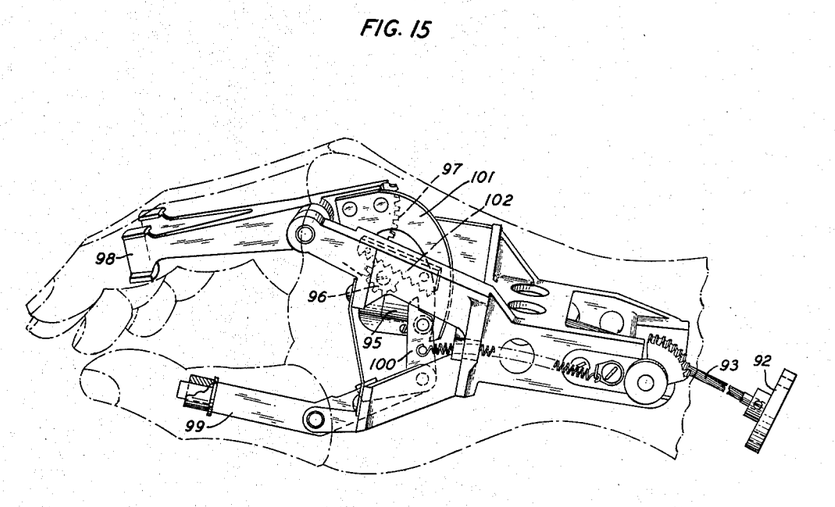
Fig. 15 is a skeletonized perspective view of a finger and thumb mechanism given as one example of a joint actuator.

Fig. 15 is submitted to disclose one example of a joint actuator. In this case a disc 92 secured to a flexible shaft 93 is provided for cooperative association with the driven element 94 of the finger clutch as indicated in Fig. 10. The shaft 93 operates a worm which is encased in the cylinder 95 and which through conventional means operates the pinion 96. In the forward motion of the motor 14 the pinion 96 meshing with the sector 97 will move the finger elements 98 and the thumb element 99 toward each other until the thumb meets an obstruction whereupon the dog 100 normally in cooperative relationship with the cam 101 locks in the rack 102 and becomes stationary so that all the power of the motor 14 is transmitted to the finger element 98. On reverse movement of the motor, the cam 101 will lift the dog 100 out of the rack 102 so that the fingers and thumb will be opened quickly.

The array of push buttons 13, 17, 18, 19, 20 and 21, particularly as shown in Fig. 3 are placed in an area easily reached by the amputee's arm stump. As hereinbefore described, the buttons 18 and 19 operate the bellows 23 connected in the pneumatic system for operating the finger actuator clutch, the button 18 operating the micro-switch 52 for running the motor forwardly and the button 19 operating the micro-switch 53 for running the motor in the reverse direction. If it is found that the individual amputee may operate the outer set of buttons 17, 19 and 21 with more force or facility then the two micro-switches may easily be interchanged so that the upper bail 43 will operate the micro-switch 53 and the lower bail will operate the micro-switch 52 instead of otherwise as shown in Fig. 13. The two micro-switches may be physically interchanged or the two wires to the motor or the two wires to the battery may be simply interchanged. Likewise, if the amputee finds that he may operate the buttons 13 and 17 with more facility than the buttons 18 and 19, the pneumatic tubes to the bellows 22 and 23 may be interchanged so as to allow that set of push buttons which will be used the most to be that set which may be operated with the greatest facility. This pneumatic tube interchange may be effected at the push button device, at the transmission device or at the bleeder valves. Thus without altering the functions of the devices in any manner, the push button array may be quickly adjusted to suit the convenience and comfort of the individual amputee.

Other joint actuators will operate in conventional manner, similar in principle to the manner disclosed in my Patent 2,580,987.

What is claimed is:

1. In a prosthetic device, a power driven arm for an above elbow amputee, having a hand, a wrist, a forearm, a shoulder cap and a plurality of joint actuators, a source of current, a motor and a transmission unit mounted in said forearm section, said transmission having a plurality of multi-disc clutches each for coupling said motor to a different joint actuator, an array of push buttons mounted on said shoulder cap in position to be in cooperative relationship with the stump of an amputee's upper arm and adapted to be selectively operated thereby, said push buttons comprising a pair of said buttons for each joint actuator, one for causing forward movement thereof and another for causing reverse movement thereof, a bellows operated by each said pair of push buttons, an expandable bladder in said transmission device for each said multi-disc clutch, a pneumatic channel for each said joint actuator interconnecting the corresponding said bellows and bladder, a pair of bails operated by said push buttons and an electrical switch operated by each said bail, one for interconnecting said source of current and said motor to impel said motor in one direction of rotation and another for impelling said motor in a reverse direction.

2. In a prosthetic device, a power driven arm for an above elbow amputee, having a hand, a wrist, a forearm, a shoulder cap and a plurality of joint actuators, a source of current, a motor and a transmission unit mounted in said forearm section, said transmission having a plurality of multi-disc clutches each for coupling said motor to a different joint actuator, an array of push buttons mounted on said shoulder cap in position to be in cooperative relationship with the stump of an amputee's upper arm and adapted to be selectively operated thereby, said push buttons comprising a pair of said buttons for each joint actuator, one for causing forward movement thereof and another for causing reverse movement thereof, a bellows operated by each said pair of push buttons, an expandable bladder in said transmission device for each said multi-disc clutch, a pneumatic channel for each said joint actuator interconnecting the corresponding said bellows and bladder, a pair of bails operated by said push buttons and an electrical switch operated by each said bail, one for interconnecting said source of current and said motor to impel said motor in one direction of rotation and another for impelling said motor in a reverse direction, and a bleeder valve in each said pneumatic channel for adjusting pressure within each said pneumatic system.

3. In a prosthetic device, a source of current, a motor, a shaft operated by said motor extending to a transmission device, a transmission device having a plurality of clutches each for coupling said motor to a joint actuator, a pneumatic means for operating each of said clutches and an array of push buttons, an electrical circuit network including conductors interconnecting said source of current, said motor and said push buttons, pneumatic devices operated by said push buttons, pneumatic tubing fitted to said pneumatic devices and extending to and fitted to said pneumatic means, each said push button having means to simultaneously operate one of said pneumatic devices to selectively enable said clutches and to connect said source of current to said motor to operate a selectively enabled clutch.

4. In a prosthetic device, a source of current, a motor, a shaft operated by said motor extending to a transmission device, a transmission device having a plurality of clutches each for coupling said motor to a different joint actuator, a pneumatic means for variably operating each of said clutches, an array of push buttons, an electrical circuit network including conductors interconnecting said source of current, said motor and said push buttons, pneumatic devices operated by said push buttons, pneumatic tubing fitted to said pneumatic devices and extending to and fitted to said pneumatic means, each said push button having means to simultaneously variably operate one of said pneumatic devices to selectively enable said clutches and to interconnect said source of current and said motor to operate a selectively enabled clutch.

5. In a prosthetic device, a source of current, a motor, a shaft operated by said motor extending to a transmission device, a transmission device having a plurality of multi-disc clutches each for coupling said motor to a different joint actuator, a pneumatic means for operating each of said clutches, an array of push buttons, an electrical circuit network including conductors interconnecting said source of current, said motor and said push buttons, pneumatic devices operated by said push buttons, pneumatic tubing fitted to said pneumatic devices and extending to and fitted to said pneumatic means, a plurality of said push buttons having control over each said pneumatic means to selectively enable said clutches, said electrical connections arranged for variously interconnecting said source of current and said motor to operate said motor from said source of current to operate a selectively enabled clutch, means controlled by said push buttons for controlling said electrical connections, a different plurality of said push buttons having control over each said electrical connection.

6. In a prosthetic device, a power driven arm for an above elbow amputee, having a hand, a wrist, a forearm section, an upper arm section, a shoulder cap and a plurality of joint actuators, a source of current, a motor, a shaft operated by said motor extending to a transmission unit and a transmission unit mounted in said forearm section, said transmission having a plurality of multi-disc clutches, each for coupling said motor to a different joint actuator, an array of push buttons mounted on said shoulder cap in position to be in cooperative relationship with the stump of an amputee's upper arm, pneumatic means for operating each said multi-disc clutch, an electrical circuit network including conductors interconnecting said source of current, said motor and said push buttons for variously coupling said source of current and said motor to cause said motor to run forwardly and in reverse, a plurality of bellows operated by said push buttons for operating said pneumatic means, pneumatic tubing fitted to said bellows and extending to and fitted to said pneumatic means, a plurality of said push buttons operating each of said bellows to selectively enable said clutches and a different plurality of said push buttons controlling each of said electrical circuits to operate said motor to operate a selectively enabled clutch.

No references cited.